United States Patent
Huang et al.

(10) Patent No.: US 10,636,264 B2
(45) Date of Patent: Apr. 28, 2020

(54) OFFICE BUILDING SECURITY SYSTEM USING FIBER SENSING

(71) Applicant: NEC Laboratories America, Inc., Princeton, NJ (US)

(72) Inventors: Ming-Fang Huang, Princeton, NJ (US); Ting Wang, West Windsor, NJ (US)

(73) Assignee: NEC Corporation (JP)

( * ) Notice: Subject to any disclaimer, the term of this patent is extended or adjusted under 35 U.S.C. 154(b) by 0 days.

(21) Appl. No.: 16/229,574

(22) Filed: Dec. 21, 2018

(65) Prior Publication Data

US 2019/0236920 A1 Aug. 1, 2019

Related U.S. Application Data

(60) Provisional application No. 62/622,209, filed on Jan. 26, 2018.

(51) Int. Cl.
*G08B 13/22* (2006.01)
*G01V 1/00* (2006.01)
*G01V 1/22* (2006.01)
*G06N 20/00* (2019.01)
*G08B 25/08* (2006.01)
(Continued)

(52) U.S. Cl.
CPC ............ *G08B 13/22* (2013.01); *G01V 1/001* (2013.01); *G01V 1/226* (2013.01); *G06N 20/00* (2019.01); *G08B 13/169* (2013.01); *G08B 13/1654* (2013.01); *G08B 19/00* (2013.01); *G08B 25/08* (2013.01); *G08B 31/00* (2013.01); *H04B 10/27* (2013.01); *H04B 10/85* (2013.01); *G06N 5/04* (2013.01)

(58) Field of Classification Search
CPC ...... G08B 13/10; G08B 13/22; G08B 13/124; G08B 13/1609; G08B 13/2422; G08B 13/2454; G08B 13/2491; G08B 19/00; G08B 25/08; G08B 29/18; G08B 29/185; G06N 20/00; G01V 1/001; G01V 1/226
USPC ........ 340/521, 531, 539.14, 541, 5.21, 5.52; 29/428; 356/32
See application file for complete search history.

(56) References Cited

U.S. PATENT DOCUMENTS 6,072,612 A * 6/2000 Liou ................... H04J 14/02
398/1
2011/0249252 A1 * 10/2011 Lantz .................. G01B 11/18
356/32
(Continued)

OTHER PUBLICATIONS

Abellan et al., "Rockfall Monitoring by Terrestrial Laser Scanning—Case Study of the Basaltic Rock Face at Castellfollit de la Roca", Nat. Hazards Earth Syst. Sci., Mar. 2011, pp. 829-841.
(Continued)

*Primary Examiner* — Hung T Nguyen
(74) *Attorney, Agent, or Firm* — Joseph Kolodka

(57) ABSTRACT

A security system is provided for a building. The security system includes a fiber optic cable arranged in various locations in the building for Distributed Vibration Sensing (DVS) and Distributed Acoustic Sensing (DAS) at the various locations. The security system further includes a machine-learning-based analyzer for selectively providing any of an early warning and a prevention of various detected conditions responsive to a machine-learning-based analysis of results from the DVS and the DAS.

16 Claims, 7 Drawing Sheets

(51) Int. Cl.
  *H04B 10/85*   (2013.01)
  *H04B 10/27*   (2013.01)
  *G08B 19/00*   (2006.01)
  *G08B 13/16*   (2006.01)
  *G08B 31/00*   (2006.01)
  *G06N 5/04*    (2006.01)

(56) References Cited

U.S. PATENT DOCUMENTS

| | | | | |
|---|---|---|---|---|
| 2012/0176496 | A1* | 7/2012 | Carbonell | H04N 7/188 348/143 |
| 2012/0214515 | A1* | 8/2012 | Davis | G01S 5/22 455/456.3 |
| 2013/0092371 | A1* | 4/2013 | Hartog | E21B 47/06 166/250.01 |
| 2013/0278422 | A1* | 10/2013 | Friedman | G08B 13/196 340/541 |
| 2016/0234232 | A1* | 8/2016 | Poder | H04L 63/1425 |
| 2017/0213447 | A1* | 7/2017 | Horrocks | G08B 19/00 |
| 2018/0322660 | A1* | 11/2018 | Smith | G06K 9/6267 |

OTHER PUBLICATIONS

Andersson et al., "Smoke Detection in Buildings with High Ceilings", SP Swedish National Testing and Research, Brandforsk Project No. 628-011, 2003, 120 pages.

Evarts, "Structure Fires in Warehouses", National Fire Protection Association, Fire Analysis and Research Division National Fire Protection Association, Sep. 2011, 27 pages.

Fraser-Mitchel et al., "Sprinkler Installation Trends and Fire Statistics for Warehouse Buildings", Building Research Establishment Ltd., DCLG Final Research Report BD 2537 (D2V1) 226839, Mar. 2006, 51 pages.

Grosshandler, "A Review of Measurements and Candidate Signatures for Early Fire Detection", Building and Fire Research Laboratory National Institute of Standards and Technology, Jan. 1995, 36 pages.

Kemeny et al., "Digital Imaging for Rock Mass Characterization", Dept. Mining and Geological Engineering, Nov. 2016, 11 pages.

McHugh et al., "Simplified Hyperspectral Imaging for Improved Geologic Mapping of Mine Slopes", National Institute for Occupational Safety and Health, In Proceedings of the Third International Conference on Intelligent Processing and Manufacturing of Materials, Aug. 2011, 10 pages.

Partsinevelos et al., Integration of Seismic and Image Data Processing for Rockfall Monitoring and Early Warning Along Transportation Networks, Springer, Nat. Hazards, Jul. 2016, pp. 3133-S153.

Peacock, "An Analysis of Security Issues in Building Automation Systems", Proceedings of the 12th Australian Information Security Management Conference, Dec. 2014, 6 pages.

Schneider Electric, T.A.C., "Integration: The Future of Commercial Office Building Security", 2006, 12 pages.

Vorster et al., "Using Radar Technology to Assess the Effect of Dewatering on Slope Stability", The Southern African Institute of Mining and Metallurgy, Slope Stability 2015, Oct. 2015, pp. 1225-138.

* cited by examiner

OFFICE BUILDING SECURITY SYSTEM USING FIBER SENSING

RELATED APPLICATION INFORMATION

This application claims priority to U.S. Prov. Pat App. Ser. No. 62/622,209, filed on Jan. 26, 2018, incorporated herein by reference herein its entirety.

BACKGROUND

Technical Field

The present invention relates to security systems and more particularly to an office building security system using fiber sensing.

Description of the Related Art

An important goal of many companies is to provide the best security to ensure the safety of its employees and the protection of its intellectual and physical property. It has been reported by the American Society of Industrial Security (ASIS) that the major security concerns of most companies are employee theft, property crime, and information security. Hence, there is a need for an improved approach to security able to address these concerns.

SUMMARY

According to an aspect of the present invention, a security system is provided for a building. The security system includes a fiber optic cable arranged in various locations in the building for Distributed Vibration Sensing (DVS) and Distributed Acoustic Sensing (DAS) at the various locations. The security system further includes a machine-learning-based analyzer for selectively providing any of an early warning and a prevention of various detected conditions responsive to a machine-learning-based analysis of results from the DVS and the DAS.

According to another aspect of the present invention, a computer-implemented method is provided for providing security for a building. The method includes arranging a fiber optic cable in various locations in the building for Distributed Vibration Sensing (DVS) and Distributed Acoustic Sensing (DAS) at the various locations. The method further includes selectively providing, by a machine-learning-based analyzer, any of an early warning and a prevention of various detected conditions responsive to a machine-learning-based analysis of results from the DVS and the DAS.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present invention is directed to an office building security system using fiber sensing.

In an embodiment, the present invention provides distributed fiber sensing along an office building for intrusion detection and access control. In an embodiment, a machine learning-based intelligent analyzer can be integrated with an existing security system to enhance the existing security system and provide an early warning in the case of an intrusion or other event. The existing security system can employ image capture devices and so forth to augment the fiber optic based sensing via Distributed Vibration Sensing (DVS) and Distributed Acoustic Sensing (DAS).

In an embodiment, optical fiber sensing is used to realize personal identification (e.g., walking patterns, footsteps, foot strength, location, and so forth) in continuously in real time. The optical fiber is laid on an office building and will transmit long-tern sensing data and signals for telecom usage simultaneously. In an embodiment, the optical fiber carries communication signals for a communication system sharing optical bandwidth with a security system.

Figure 1:
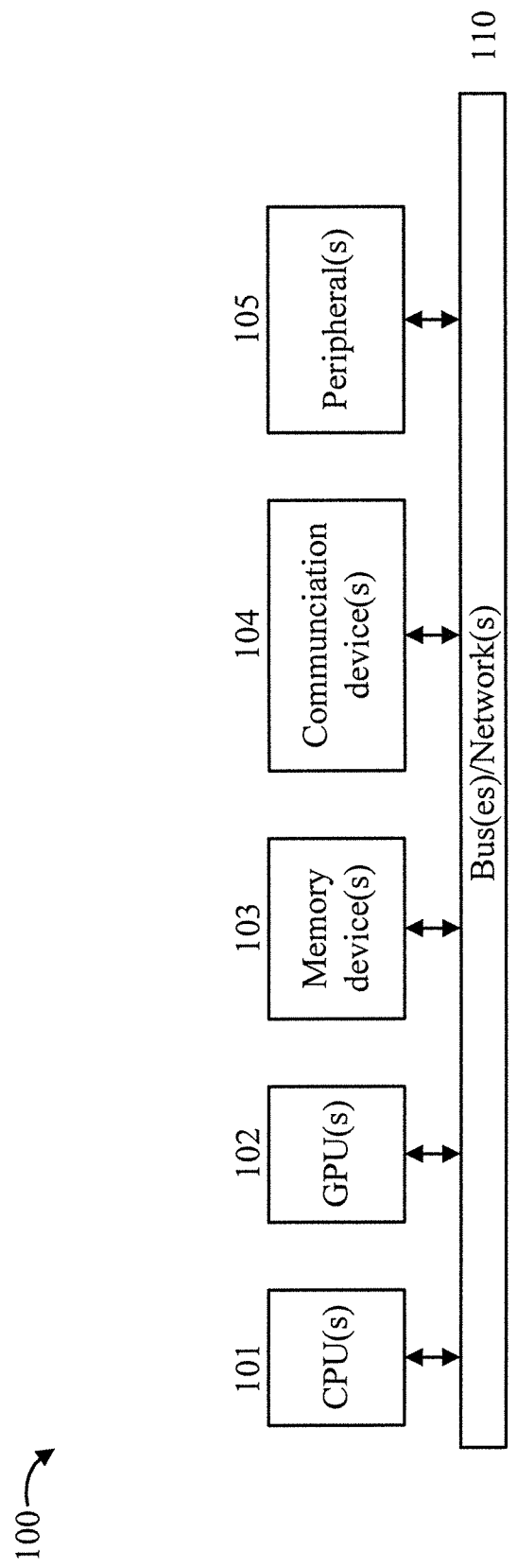
FIG. 1 is a block diagram showing an exemplary processing system to which the present invention may be applied, in accordance with an embodiment of the present invention.

FIG. 1 is a block diagram showing an exemplary processing system 100 to which the present invention may be applied, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. Further, in another embodiment, a cloud configuration can be used. These and other variations of the processing system 100 are readily contemplated by one of ordinary skill in the art given the teachings of the present invention provided herein.

Moreover, it is to be appreciated that various figures as described above with respect to various elements and steps relating to the present invention that may be implemented, in whole or in part, by one or more of the elements of system 100. Moreover, one or more elements of system 100 may be used to control one or more elements of the various architectures described herein.

Figure 2:
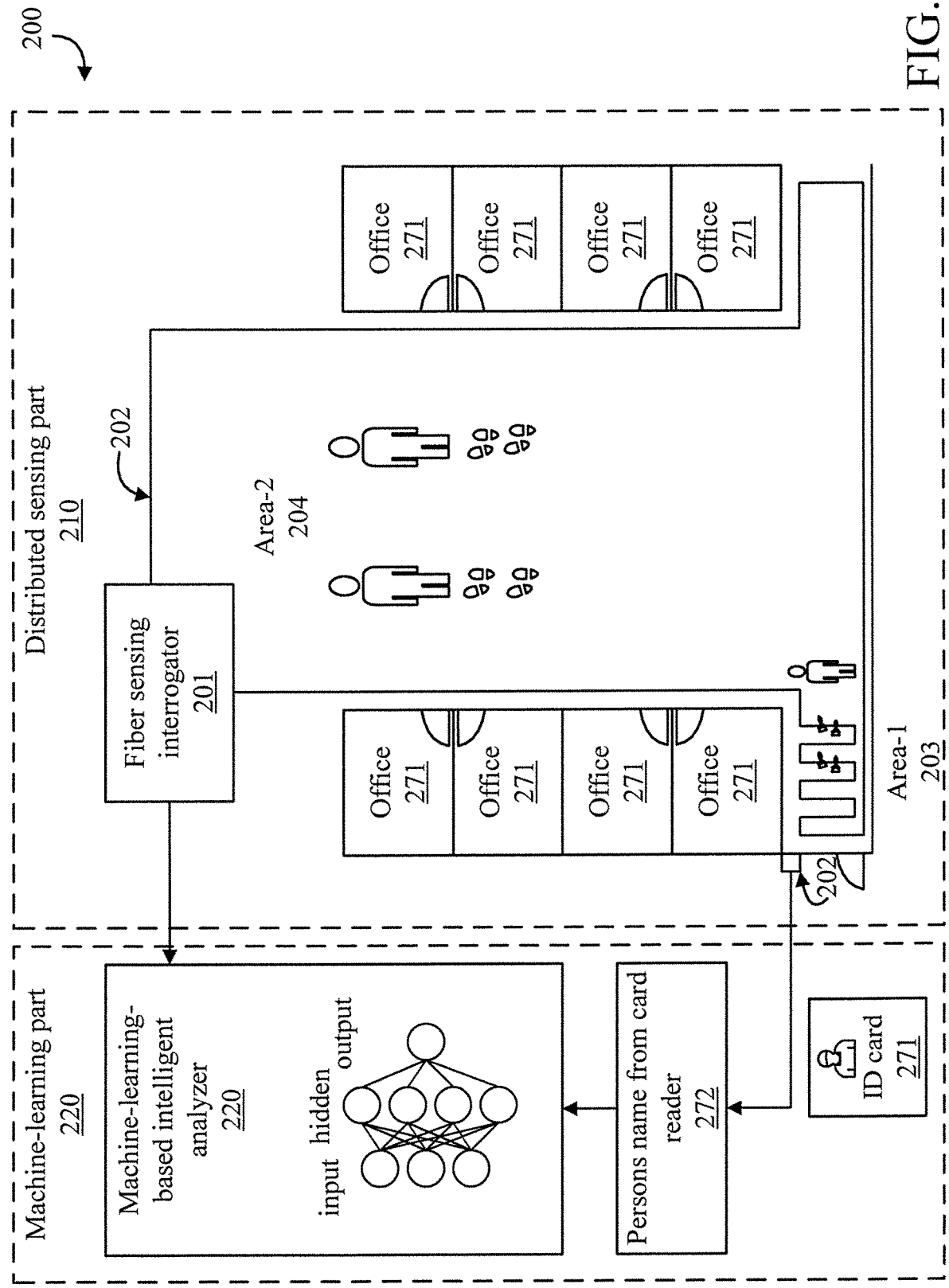
FIG. 2 is a block diagram showing an exemplary office building security system, in accordance with an embodiment of the present invention.

FIG. 2 is a block diagram showing an exemplary office building security system 200, in accordance with an embodiment of the present invention.

The description is relative to an office building having offices 271 and Area-1 203 and Area-2 204.

In particular, FIG. 2 shows an office building security system 200 realized by integrating distributed vibration sensing (DVS), machine learning-based intelligent analyzer, and existing access control. For the sake of description, the system 200 will be described with respect to the following two parts: (1) a distributed sensing part 210 and (2) machine learning-based intelligent analyzer part 220. The arranging of optical fiber in relation to an office building is used to obtain personal biometric information such as walking patterns, footsteps, and foot strength. To localize personal location, walking paths of each employee can be tracked through distributed sensing for unauthorized entry and suicide prevention.

For the distributed sensing part 210, the technology deployed in office buildings can be Distributed Vibration Sensing (DVS). The sensing transmitter and receiver are located in a fiber sensing interrogator 201 to receive entire sensing signals captured from optical fiber 202. Based on the high resolution achievable using DVS, the walking patterns, footsteps, and foot strength of each employee can be detected and analyzed.

After swiping an ID card for access, employees will first pass through area-1 103. Special fiber routes are located in this area for people counting, foot strength, footsteps and directional detection.

Figure 3:
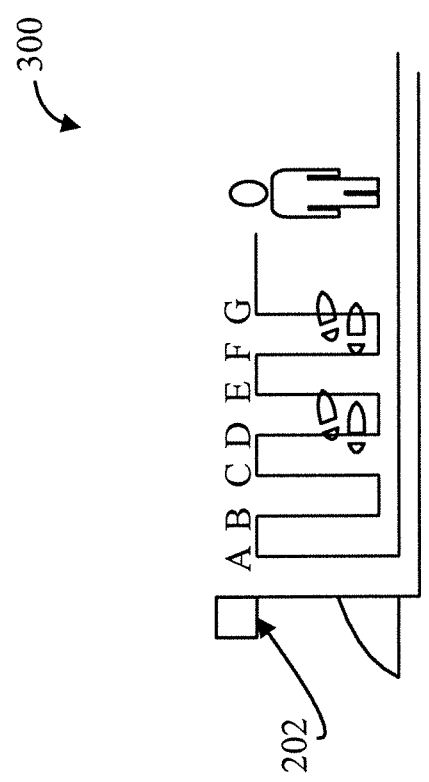
FIG. 3 is a block diagram showing the use of Distributed Vibration Sensing (DVS) for people counting and direction detection, in accordance with an embodiment of the present invention.

FIG. 3 is a block diagram showing the use 300 of DVS for people counting and direction detection, in accordance with an embodiment of the present invention. For directional detection, the received sensing data from line-A to line-G or the converse (from line-G to line-A) in time sequence order will realize the direction of entry and exit. People counting can also be done by monitoring the DVS data in Area-1 203. A stealthy follower can be discovered when multiple footsteps are detected but only one ID swiped for unauthorized entry prevention. The foot strength can also be sensed in this area by crossing multiple fiber routes.

Figure 4:
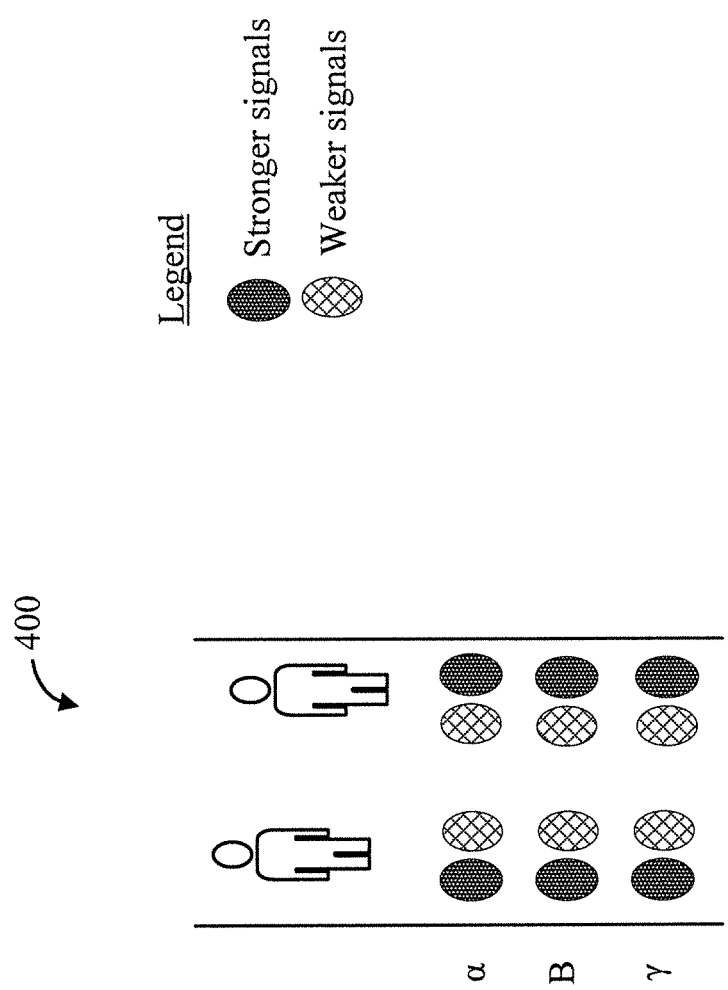
FIG. 4 is a block diagram showing direction confirmation and parallel walking identification, in accordance with an embodiment of the present invention.

In area-2 204, based on 2-fiber scheme, the parallel walking can be identified, as shown in FIG. 4. In particular, FIG. 4 shows direction confirmation and parallel walking identification 400, in accordance with an embodiment of the present invention. In the same time sequence, two fiber locations will detect different strengths of sensing signals (stronger and weaker) to identify parallel walking. In different time sequences, the walking direction will be discovered while receiving DVS signals from α to γ or the converse (from γ to α).

Referring back to FIG. 2 regarding the machine learning part 292, the same includes a machine learning-based intelligent analyzer 201 that receives sensing data from the interrogator 201 and basic employee information 262 from a card reader 202. In a training period, after an employee swipes the ID card for access, all of the information such as walking patterns, footsteps, foot strength is recorded as personal unique identification for that employee. Fiber sensors will track each employee from the access door 203 to an individual office as well as frequented locations. This can be used for detecting the embezzling of a security card for unlawful entry prevention, employee theft prevention and suicide prevention.

Further regarding the machine learning part 292, the same can be implemented using a learning mechanism such as a neural network and so forth. Supervised or unsupervised learning techniques can be used, as readily appreciated by one of ordinary skill in the art, given the teachings of the present invention provided herein. In an embodiment, a reward-based learning mechanism is used. The activation functions of a neural network can be implicated based on different events to be detected. For example, one activation function can pertain to ID card embezzlement, while another activation function can pertain to suicide and its detection and prevention. These and other variations of the machine learning part 292 are readily determined by one of ordinary skill in the art given the teachings of the present invention provided herein, while maintaining the spirit of the present invention.

Figure 5:
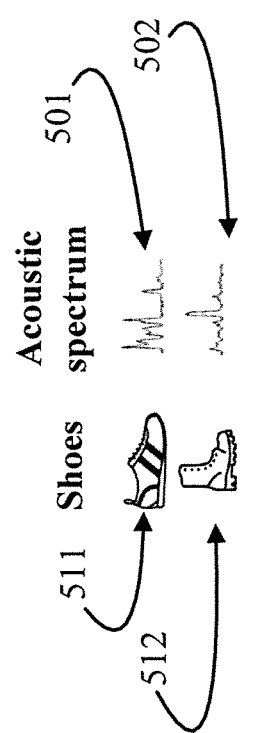
FIG. 5 is a block diagram showing unique acoustic spectra and from different shoes, in accordance with an embodiment of the present invention.

FIG. 5 is a block diagram showing unique acoustic spectra 501 and 502 from different shoes 511 and 512, respectively, in accordance with an embodiment of the present invention.

Referring back to FIG. 2, after a machine training period to obtain personal unique identification and frequent locations, the real-time office building security system 200 can be utilized for event detection. Another benefit of fiber sensor is detecting acoustic signals using a Distributed Acoustic Sensor (DAS). By combining DAS functionalities, a database 261 of personal identification will keep updating if the employee changes their footwear and so forth.

In an embodiment, a warning alarm will be triggered in the following situations: (1) personal walking patterns, footsteps and foot strength does not match the names from the access door without changing footwear; (2) employee does not go to their corresponding (unique) office; (3) infrequent locations discovered and (4) unauthorized entry.

Figure 6:
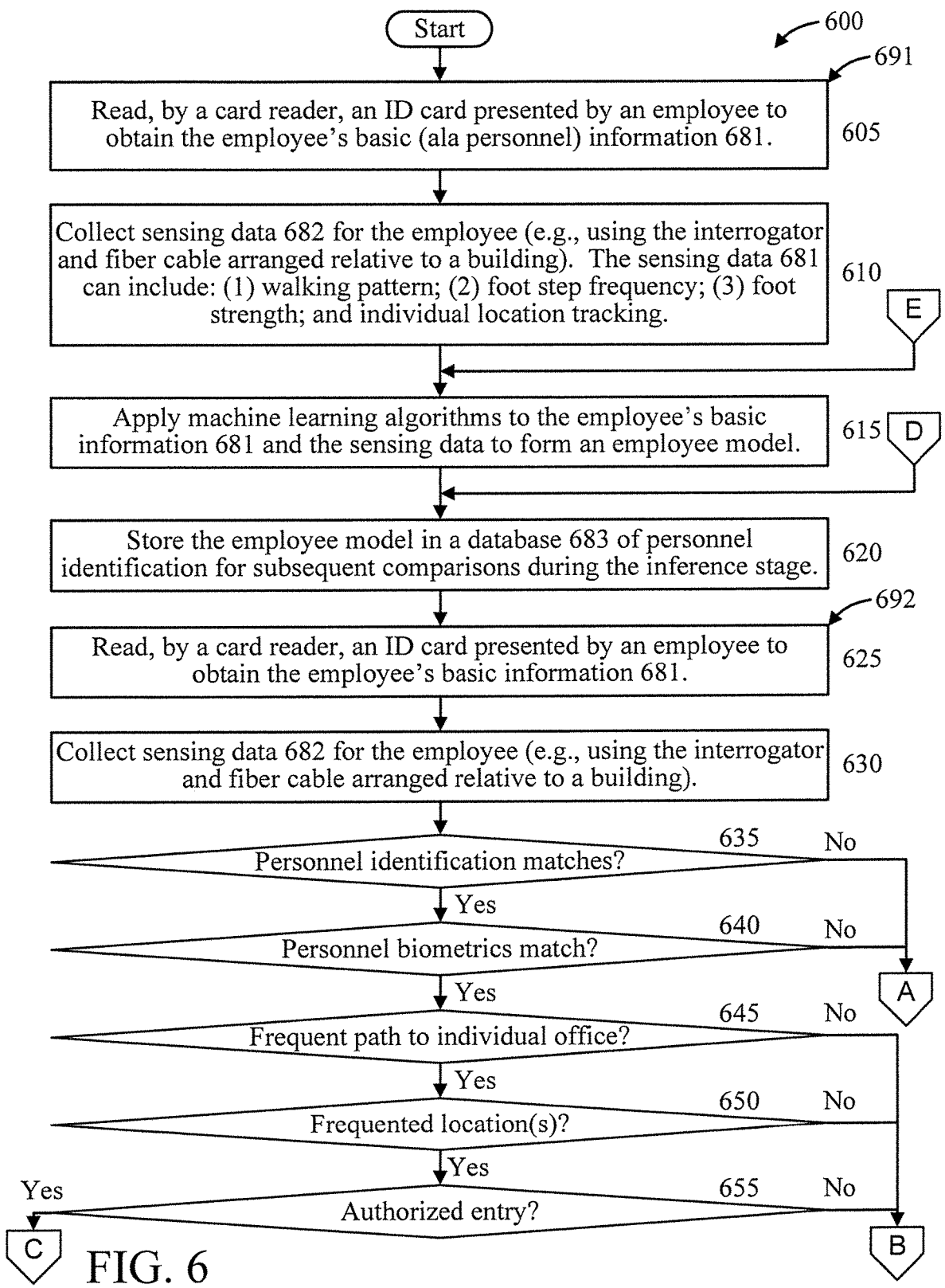
FIGS. 6-7 are high-level block diagrams showing an exemplary method for a machine training period and security tracking, in accordance with an embodiment of the present invention.
Figure 7:
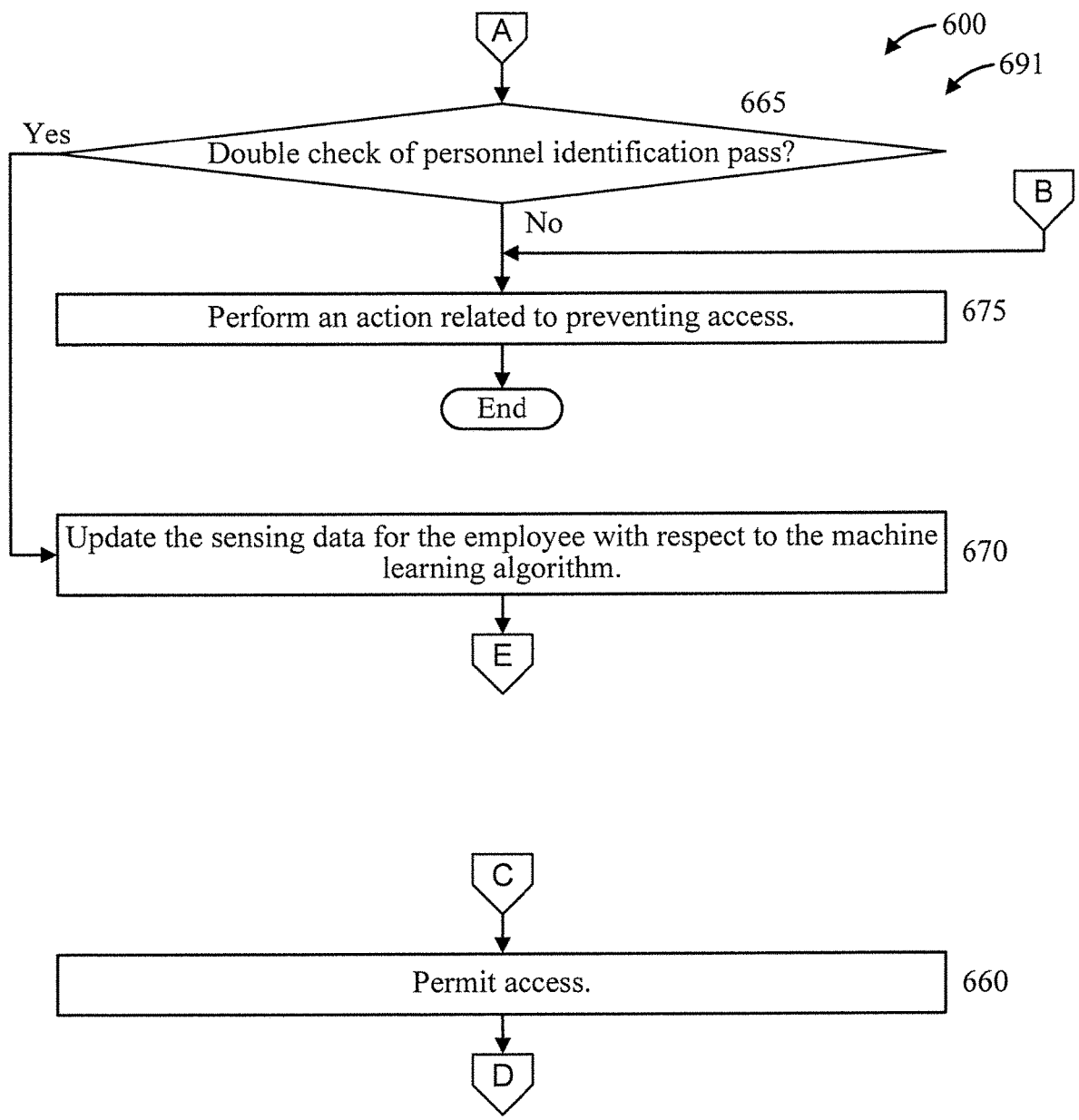

Referring to FIGS. 6-7, high-level block diagrams show an exemplary method 600 for a machine training period and security tracking, in accordance with an embodiment of the present invention. The method 600 is performed relative to a building that has fiber cable arranged throughout for event detection for an enhanced security system in accordance with the present invention. Moreover, the method 600 includes a machine training stage 691 (or "training stage" in short) and an inference stage 692. In particular, the machine training stage 691 includes blocks 605 through 620, and the inference stage 692 includes blocks 625 through 675.

At block 605, read, by a card reader, an ID card presented by an employee to obtain the employee's basic information (e.g., name, position in company, etc.), also interchangeably referred to herein as personnel information and collectively referred to using the figure reference numeral 681.

At block 610, collect sensing data 682 for the employee (e.g., using the interrogator and fiber cable arranged relative to a building). In an embodiment, the sensing data 681 can include one or more of the following: (1) walking pattern; (2) foot step frequency; (3) foot strength; and individual location tracking.

At block 615, apply machine learning algorithms to the employee's basic information 681 and the sensing data in order to form a model of the employee.

At block 620, store the employee model in a database 683 of personnel identification for subsequent comparisons during the inference stage.

At block 625, read, by a card reader, an ID card presented by an employee to obtain the employee's basic information.

At block 630, collect sensing data 682 for the employee (e.g., using the interrogator and fiber cable arranged relative to a building).

At block 635, compare the employee's basic (personnel) identification to the models stored in the database 683 to determine if any matching models exist. If so, the proceed to block 640. Otherwise, proceed to block 670.

At block 640, compare the employee's personnel biometrics (e.g., foot strength) to the models stored in the database 683 to determine if any matching models exist. If so, the proceed to block 645. Otherwise, proceed to block 670.

At block 645, determine whether the employee's path to an individual office matches the identified employee's specified (frequent) path. If so, then proceed to block 650. Otherwise, proceed to block 675.

At block 650, determine whether the locations passed by the employee correspond to (previously) frequented locations by the employee. If so, then proceed to block 660. Otherwise, proceed to block 675.

At block 655, determine whether the attempted entry is authorized. If so, then proceed to block 665. Otherwise, proceed to block 675.

At block 660, permit access. In an embodiment, block 665 can involve actions such as unlocking an electronic door and/or an electronic lock and so forth to provide an employee access.

At block 665, double check the employee's personnel identification to see if the employee's identification checks out. If so, then proceed to block 670. Otherwise, proceed to block 675.

At block 670, update the sensing data for the employee with respect to the machine learning algorithm. For example, the sensing data can include a change in footwear (DAS data), an awareness of an injured condition, and/or so forth.

At block 675, perform an action related to preventing access. The action can include generating an alarm, sending an email, locking an electronic door and/or and an electronic lock, and so forth. It is to be appreciated that the preceding actions are merely illustrative and, thus, other actions can be performed, depending upon the implementation.

A description will now be given regarding some of the many attendant advantages of the present invention. The proposed scheme advantageously integrates Distributed Vibration Sensing (DVS) and machine learning-based intelligent analysis to provide a security system and access network through optical fiber installed relative to an office building. The present invention can be integrated with existing access badge systems and presents very promising performance for event detection in-real time with early warning of detected events.

Thus, the present invention provides an early warning solution through distributed fiber sensing and machine-learning-based intelligent analysis. Benefits can include office building security monitoring in real-time, machine-learning-based intelligent analysis for false alarm reduction, and the use of a single optical fiber to provide sensing (DVS and DAS) and communication services.

The DVS can be used with respect to high precision personal biometrics detection which can include, but is not limited to, walking patterns, footsteps, and foot strength. The DVS can further include indoor positioning such as, for example, frequent and infrequent locations. The DVS can also include 2-fiber solutions as follows: (1) directional detection; and (2) identification of parallel/multiple people walking.

The DAS can be used to identify unique acoustic spectra from shoes/footwear.

The present invention can used to provide an early warning, for not matched personal information and biometrics, relating to embezzling/borrowing security card for access and unlawful entry.

The present invention can provide intrusion prevention for employee theft prevention relating to the following: infrequent location discovered; and unauthorized entry discovered. Moreover, the present invention can be used for suicide prevention by discovering infrequent location occupation (to higher floors, etc.).

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A security system for a building, comprising:
    a fiber optic cable arranged in various locations in the building for Distributed Vibration Sensing (DVS) and Distributed Acoustic Sensing (DAS) responsive to sensing signals of the fiber optic cable at the various locations; and
    a machine-learning-based analyzer for selectively providing any of an early warning and a prevention of various detected conditions of one or more persons responsive to a machine-learning-based analysis of the sensing signals from the DVS and the DAS,
    wherein the machine-learning-based analyzer analyzes the sensing signals from the DVS to detect walking patterns, footsteps, foot strength, walking direction and multiple persons walking at a given time.

2. The security system of claim 1, wherein the fiber optic cable carries communication signals for a communication system sharing optical bandwidth with the security system.

3. The security system of claim 1, wherein the machine-learning-based analyzer analyzes the sensing signals from the DVS to detect indoor positioning relative to frequented and unfrequented locations.

4. The security system of claim 1, wherein the machine-learning-based analyzer analyzes the sensing signals from the DAS to detect unique acoustic spectra corresponding to different footwear.

5. The security system of claim 1, wherein various conditions capable of being detected comprise misusing another person's security card and unauthorized entry.

6. The security system of claim 1, wherein the machine-learning-based analyzer performs an action to restrict a person within a containment area, responsive to the sensing signals of any of the DVS and the DAS.

7. The security system of claim 6, wherein the action is performed responsive to a determination of a potential theft or a potential suicide.

8. The security system of claim 1, further comprising a user biometric database for storing biometric information obtained using the DVS and the DAS.

9. A computer-implemented method for providing security for a building, comprising:
    arranging a fiber optic cable in various locations in the building for Distributed Vibration Sensing (DVS) and Distributed Acoustic Sensing (DAS) responsive to sensing signals of the fiber optic cable at the various locations; and
    selectively providing, by a machine-learning-based analyzer, any of an early warning and a prevention of various detected conditions of one or more persons responsive to a machine-learning-based analysis of the sensing signals from the DVS and the DAS,
    wherein the machine-learning-based analyzer analyzes the sensing signals from the DVS to detect walking patterns, footsteps, foot strength, walking direction and multiple persons walking at a given time.

10. The computer-implemented method of claim 9, further comprising sharing, by the fiber optic cable, optical bandwidth to carry communication signals for an optical communication system along with other communication signals for the DVS and the DAS.

11. The computer-implemented method of claim 9, further comprising analyzing, by the machine-learning-based analyzer, the sensing signals from the DVS to detect indoor positioning relative to frequented and unfrequented locations.

12. The computer-implemented method of claim 9, wherein the machine-learning-based analyzer analyzes the sensing signals from the DAS to detect unique acoustic spectra corresponding to different footwear.

13. The computer-implemented method of claim 9, wherein various conditions capable of being detected comprise misusing another person's security card and unauthorized entry.

14. The computer-implemented method of claim 9, further comprising performing, by the machine-learning-based analyzer, an action to restrict a person within a containment area, responsive to the results of any of the DVS and the DAS.

15. The computer-implemented method of claim 14, wherein the action is performed responsive to a determination of a potential theft or a potential suicide.

16. The computer-implemented method of claim 9, further comprising storing, in a user biometric database, biometric information obtained using the DVS and the DAS.

* * * * *